United States Patent Office 3,435,094
Patented Mar. 25, 1969

3,435,094
ETHYLENE GLYCOL-BASED, ORGANIC SOLVENT-RESISTANT POLYESTER RESINS
Earl E. Parker, Allison Park, Pa., assignor to PPG Industries, Inc., Pittsburgh, Pa., a corporation of Pennsylvania
No Drawing. Continuation-in-part of application Ser. No. 561,759, June 30, 1966. This application Feb. 14, 1968, Ser. No. 705,302
Int. Cl. C08g 17/10; C08f 11/02; C09k 3/68
U.S. Cl. 260—872                                    16 Claims

ABSTRACT OF THE DISCLOSURE

An organic solvent-resistant polyester resin is formed from a glycol comprising a major amount of ethylene glycol and a minor amount of a neopentyl glycol-type diol and an acid component comprising a major amount of a polymerizable, ethylenically unsaturated dicarboxylic acid and a minor amount of a member selected from the group consisting of terephthalic acid or a lower alkyl diester thereof and isophthalic acid or a lower alkyl diester thereof. Compositions containing the polyester and a polymerizable ethylenically unsaturated monomer may be coated on substrates to protect them from attack from organic solvents.

---

This application is a continuation-in-part of U.S. application Ser. No. 561,759, filed June 30, 1966, now abandoned.

Unsaturated polyesters, usually prepared from ethylenically unsaturated acids and dihydric alcohols, can be cross-linked at points of unsaturation, usually by means of polymerizable ethylenically unsaturated compounds, to provide widely used molding resins, casting resins, and coating resins. The relative strength, physical strength, molding properties and application properties of such compositions have stimulated workers in the field in the development of polyester compositions which are especially suitable in a variety of specific applications.

One highly desirable property of such resins is that of organic solvent-resistance, which is the ability of a cured resin to resist chemical attack by organic substances such as, for example, acetone, ethylene acetate, toluene or trichloroethylene. Such resistance is especially important when the organic substances are at high temperatures where they are, of course, most active. This property has recently become of increased importance because of an expanding need for containers for organic solvents and the use of such resins in producing linings for tanks, ducts, pipes, and the like, utilized in carrying and storing organic solvents.

A variety of resin systems have been examined with this property in mind but the results have usually been disappointing. Even the more promising combinations of glycols and acids have been beset with difficulties varying from lack of the desired organic solvent-resistance itself to additional problems such as, for example, premature gelation of the unsaturated polyester before it can be crosslinked to obtain usable products, or formation of high-melting crystalline unsaturated polyesters which cannot be readily blended with crosslinking compounds. Thus, even a judicious choice of components, or of proportions of components, does not assure the desired polyester system and, consequently, the property of organic solvent-resistance has usually not been effectively present in any polyester system.

It has now been discovered that outstanding organic solvent-resistant, noncrystalline, polyester resins which are soluble in polymerizable ethylenically saturated monomers are attainable by employing a unique combination of specific glycols and dicarboxylic acids in the preparation of the unsaturated polyester of the resin system. The glycol component of the unsaturated polyesters of the invention comprises a major proportion of ethylene glycol and a minor proportion of a neopentyl glycol-type diol. The acid component comprises a major amount of a polymerizable ethylenically unsaturated dicarboxylic acid, or anhydride thereof, preferably a member selected from the group consisting of maleic anhydride, maleic acid, fumaric acid, itaconic acid, itaconic anhydride, mesaconic acid, aconitic acid, and citraconic acid, and minor proportions of terephthalic acid or a lower alkyl diester thereof, or isophthalic acid or a lower alkyl diester thereof.

The degree of organic solvent-resistance attained by these products is entirely unexpected in view of the common tendency of organic substances to be dissolved by organic solvents, as indicated by the chemical axiom that "like dissolves like." Thus, many organic resin systems can be prepared with resistance to inorganic chemical solutions, but few have been discovered which can be so used with organic solvents.

More specifically, organic solvent-resistance has never been associated with polyester systems which employ ethylene glycol as the major proportion of the glycol component. For example, unsaturated polyesters prepared solely from maleic anhydride and ethylene glycol or fumaric acid and ethylene glycol have not been so used because of the many problems, including those characteristic of high-melting crystalline polyesters and resulting from premature gelation, which can and does occur during any attempts to obtain such resistance.

High-melting, crystalline, unsaturated polyesters are especially disadvantageous as they are incompatible with the crosslinking material and will separate out from the crosslinking material when cold-blended, and if hot-blended with the crosslinking material, will separate out when it is cooled. By using minor amounts of neopentyl glycol-type diols, the crystallinity is reduced to such a degree that the resulting polymer may be blended in liquid form.

Premature gelation results from undesired crosslinking of the unsaturated polyester while it is being prepared or prior to blending with appropriate crosslinking compounds. The result is a product which is no longer capable of being crosslinked with such compounds and is usually completely unusable. Minor amounts of terephthalic acid or a lower alkyl diester thereof or isophthalic acid, or a lower alkyl diester thereof, or mixtures thereof, have been found to eliminate this problem completely, without significantly impairing the outstanding organic solvent-resistance of the cured polyester.

It is especially surprising that such organic solvent-resistance is obtainable employing neopentyl glycol-type diols. The structure common to these compounds has been found to be valuable where inorganic chemical resistance is sought, as disclosed in copending application U.S. Ser. No. 561,739, filed June 30, 1966. This fact would tend to indicate that the diols would be ineffective in achieving organic solvent-resistance, since materials valuable in the one type of resistance are usually unusable in the other, and impairment of this property has usually resulted, especially where neopentyl glycol has been employed. Yet minor amounts of neopentyl glycol-type diols, when used as in this invention, not only contribute desirable properties, as described above, but are also free from any weakening of organic solvent-resistance.

Thus, the specific acids and glycols used in preparing the unsaturated polyesters of this invention are uniquely compatible and result in an unsaturated polyester which is easily prepared using conventional polyesterification procedures, and can also be readily hot-blended with a variety of crosslinking materials to provide an outstanding organic solvent-resistant resin system.

The neopentyl glycol-type diols of this invention may be represented by the formula:

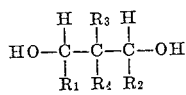

$$\mathrm{HO-\underset{\underset{R_1}{|}}{\overset{\overset{H}{|}}{C}}-\underset{\underset{R_4}{|}}{\overset{\overset{R_3}{|}}{C}}-\underset{\underset{R_2}{|}}{\overset{\overset{H}{|}}{C}}-OH}$$

where $R_1$ and $R_2$ are selected from the group consisting of hydrogen and lower alkyl radicals, and where $R_3$ and $R_4$ are lower alkyl radicals.

The constituents represented by $R_1$ and $R_2$ include hydrogen and alkyl radicals of 1 to 5 carbon atoms, such as methyl, ethyl or propyl radicals; $R_3$ and $R_4$ may each be alkyl radicals of 1 to 4 carbon atoms, such as methyl, ethyl or propyl radicals. The preferred neopentyl-glycol type diol is 2,2-dimethyl-1,3-propanediol and other suitable diols of this type include, for example, 2,2-dimethyl-1,3-pentanediol; 2,2-dimethyl-1,3-butanediol; and 2,2-dimethyl-1,3-hexanediol.

The glycol component of the polyesters herein comprises from about 50 mol percent to about 90 mol percent of ethylene glycol, and from about 10 mol percent to about 50 mol percent of a neopentyl glycol-type diol. An especially preferred combination comprises about 90 mol percent of ethylene glycol and about 10 mol percent of neopentyl glycol.

The acid component of the polyesters herein comprises from about 50 mol percent to about 90 mol percent of an ethylenically unsaturated dicarboxylic acid and from about 10 mol percent to about 50 mol percent of terephthalic acid or a lower alkyl diester thereof or isophthalic acid or a lower alkyl diester thereof. When other acids are employed, they may be used in amounts of up to about 10 mol percent of the total acid component. An especially preferred acid component comprises about 90 mol percent maleic anhydride and about 10 mol percent of terephthalic acid.

The polymerizable ethylenically unsaturated dicarboxylic acids, which constitute a major proportion of the acid component of this invention, include maleic acid, fumaric acid, aconitic acid, mesaconic acid, citraconic acid, itaconic acid and halo and alkyl derivatives of such acids. The anhydrides of these acids, where the anhydrides exist are embraced within the term "acid" since the reaction products produced therefrom, that is, the polyesters, are the same. Maleic acid, fumaric acid and citraconic acid are preferred acids and an especially preferred material is maleic anhydride.

Minor amounts of up to about 10 mol percent of the total acid component of other acids, including saturated dicarboxylic acids such as succinic acid, adipic acid, suberic acid, and the like, and polybasic acids such as trimellitic anhydride, may also be used in preparing the organic solvent-resistant unsaturated polyesters of this invention.

The addition of at least about 10 mol percent of terephthalic acid or its lower alkyl diester or isophthalic acid or its lower alkyl diester to the acid component and at least about 10 mol percent of the neopentyl glycol-type diol to the glycol component of the polyester is essential to this invention as polyesters formed from ethylene glycol and maleic acid alone or ethylene glycol and fumaric acid alone are either crystalline or are not soluble in polymerizable ethylenically unsaturated monomers such as styrene or diallyl phthalate. It has been found that the addition of a neopentyl glycol-type diol and the terephthalic acid, isophthalic acid or the lower alkyl diesters of these acids produce a soluble, noncrystalline polyester which retains its resistance to organic solvents.

The most preferred unsaturated polyester compositions are prepared using from about 30 mol percent to about 50 mol percent of ethylene glycol, and from about 2 to about 25 mol percent of neopentyl glycol, from about 30 to about 43 mol percent of maleic anhydride and from 5 to about 20 mol percent of terephthalic acid, based on the total number of mols of glycol and dibasic acid used. An example of an outstanding resin system within this range would be a composition consisting of 5 mol percent of neopentyl glycol, 48 mol percent of ethylene glycol, 42 mol percent of maleic anhydride and 5 mol percent of terephthalic acid.

In producing the polyesters from the above components, the molar ratio of glycol components to acid components is generally from about 1:1 to about 1.3:1.

The above unsaturated polyester is prepared according to standard practices. The organic unsaturated dicarboxylic acid compound or compounds can be mixed with the glycol materials and the mixture heated gradually, for example, at a rate of about 1° C. to about 5° C. per minute to a temperature of from 150° C. to 250° C. An esterification reaction catalyst is also preferably employed, such as, for example, dibutyl tin oxide. The reaction mixture is then maintained within this temperature range until esterification is completed, with accompanying evolution of an evaporation of water. A solvent may be used, such as a nonreactive medium of low solubility in water as, for example, an aromatic hydrocarbon such as xylene or toluene, or other medium, to distill azeotropically with the water of the reaction and thus to promote the removal of the latter from the system. Depending upon he nature of the individual reactant, and the quantities employed, completion of the reaction is noted by no further change in viscosity of the mixture.

It is often desirable to use an ester interchange reaction in forming the unsaturated polyester of this invention or to use such method as one stage of the polyesterification reaction. Thus, when dimethyl terephthalate is used in place of terephthalic acid, or dimethyl isophthalate is used in place of isophthalic acid an appropriate catalyst, such as PbO is used to obtain the desired polyester.

The polyesterification reaction can also be conducted without azeotroping agents as, for example, by means of the fusion process in which a nonreactive gas is blown through a reaction mixture in order to remove the water. Such a process is described in U.S. Patents Nos. 3,109,831, 3,109,832 and 3,109,834.

In ordinary usage, the above unsaturated polyesters are crosslinked by means of polymerizable, ethylenically unsaturated compounds such as, for example, styrene, divinyl benzene, methyl acrylate, vinyl toluene, and the like. The preferred monomers are liquid compounds, soluble in the polyester components, such as styrene or vinyl toluene, and an especially preferred monomer is diallyl phthalate.

The monomer component or components may be employed in amounts of up to about 60 percent of the total weight of polyester monomer. The amount of monomer should be sufficient to provide a liquid, flowable, interpolymerizable mixture. Usually, the amount of the monomer would fall within the range of about 25 percent to about 65 percent by weight of the total mixture of polyester and monomer. At the preferred range, the monomer is utilized in an amount of about 30 percent to about 50 percent.

The crosslinking monomers may be combined with the above unsaturated polyester using conventional polyester process equipment, for example, by simply mixing together the components at temperatures of about 100° C. to about 140° C. To prevent any tendency for premature gelation, it is preferred to include a conventional gelation inhibitor in one or both components of the mixture. Suitable inhibitors may be selected from various materials, including quinonic or phenolic compounds such as p-benzoquinone, hydroquinone, and 4-t-butyl catechol; quaternary ammonium salts, including trimethyl benzyl ammonium chloride, trimethyl benzyl ammonium acid oxalate, trimethyl benzyl ammonium tartrate and the like; and halide salts of amines, such as trimethylamine hydrochloride, triethylamine hydrochloride, trimethylamine hydrobromide, and the like.

The gelation inhibitor remains in the solution of unsaturated polyester interpolymerizable monomer and acts as an inhibitor of gelation during subsequent storage of material before the latter is actually used. The amount of inhibitor required in the mixture during the mixing stage is susceptible to wide variation, but preferably is in a range of about 0.001 percent to about 0.1 percent by weight based upon the polyester component of the mixture.

When the interpolymerizable mixture is to be employed in the preparation of castings or laminates or other products, there is employed a polymerization catalyst, conventionally a free radical catalyst, such as an organic peroxide, organic hydroperoxide, or esters thereof. Examples are benzoyl peroxide, tertiary butyl perbenzoate, tertiary butyl hydroperoxide, cumene hydroperoxide, azo-bis(isobutylnitrile) and the like. The catalysts are generally used in amounts of about 0.1 percent to about 5 percent by weight, based upon the mixture of interpolymerizable materials, and varying with the activity of any accelerator used and any inhibitor present in the interpolymerizable mixture.

In many applications, it is desirable to start the polymerization without the application of external heat. In such cases, it is customary to add an accelerator to the system. Suitable accelerators include cobalt salts such as cobalt octoate or cobalt naphthonate and tertiary amine accelerators such as N-ethyl-N-hydroxyethyl-m-methylaniline and N-propyl-N-hydroxyethyl-m-methylaniline.

The following examples illustrate in detail the method of practicing the instant invention. The examples are not intended to limit the invention, however, for there are, of course, numerous possible variations and modifications.

EXAMPLE 1

An unsaturated polyester of this invention was prepared in the following manner:

One-tenth of a part of dibutyl tin oxide was added to 100 parts of a composition having the following proportions:

| | Mol proportions |
|---|---|
| Terephthalic acid | 1 |
| Ethylene glycol | 9.5 |
| Neopentyl glycol | 1 |

The mixture was cooked at approximately 200° C. until the terephthalic acid was entirely dissolved. Nine mols of maleic anhydride were added along with 0.01 percent by weight of the composition of hydroquinone and 0.01 percent by weight of the composition of diphenylquinone. The temperature was raised to 235° C. and maintained at this level until the viscosity of the polyester had increased to $Z_4+$ in the Gardner-Holdt scale. (The viscosity determinations on these examples were run on a 60 percent by weight solution of the product in ethylene glycol monoethyl ether.) The resulting product had an acid number of 33.

EXAMPLE 2

An unsaturated polyester of this invention was prepared as in Example 1, using the following proportions:

| | Mol proportions |
|---|---|
| Neopentyl glycol | 3 |
| Ethylene glycol | 7.5 |
| Maleic anhydride | 7 |
| Terephthalic acid | 3 |

The resulting product had an acid number of 26 and a viscosity (Gardner-Holdt) of $Z_4+$.

EXAMPLE 3

An unsaturated polyester of this invention was prepared as in Example 1, using the following proportions:

| | Mol proportions |
|---|---|
| Neopentyl glycol | 3 |
| Ethylene glycol | 8.5 |
| Maleic anhydride | 6 |
| Isophthalic acid | 4 |

The resulting product had an acid number of 6.3 and a viscosity (Gardner-Holdt) of $Z_2+$.

EXAMPLE 4

An unsaturated polyester of this invention was prepared as in Example 1, using the following proportions:

| | Mol proportions |
|---|---|
| Neopentyl glycol | 2 |
| Ethylene glycol | 9.5 |
| Maleic anhydride | 6 |
| Isophthalic acid | 4 |

The resulting product had an acid number of 8.6 and a viscosity (Gardner-Holdt) of $Z_4+$.

EXAMPLE 5

An unsaturated polyester of this invention was prepared by charging a reaction vessel with the following:

| | Mol proportions |
|---|---|
| Neopentyl glycol | 1 |
| Ethylene glycol | 9.5 |
| Dimethyl terephthalate | 3 |

One hundred parts of the above was mixed with 0.06 part of lead oxide and the mixture was gradually heated to a temperature of 190° C. and maintained at this temperature for 4½ hours at which point the ester interchange reaction was completed. Next, 7 mols of maleic anhydride were added along with 0.01 percent by weight of the composition of hydroquinone and 0.01 percent by weight of the composition of diphenylquinone. The temperature was raised to 235° C. and maintained at this level until the viscosity of the polyester had increased to Z in the Gardner-Holdt scale. The resulting product had an acid number of 37.

EXAMPLE 6

An unsaturated polyester of this invention was prepared as in Example 5, using the following proportions:

| | Mol proportions |
|---|---|
| Neopentyl glycol | 3 |
| Ethylene glycol | 7.5 |
| Maleic anhydride | 9 |
| Dimethyl terephthalate | 1 |

The resulting product had an acid number of 45 and a viscosity (Gardner-Holdt) of $X+$.

EXAMPLE 7

An unsaturated polyester of this invention was prepared as in Example 5, using the following proportions:

| | Mol proportions |
|---|---|
| Neopentyl glycol | 1 |
| Ethylene glycol | 9.5 |
| Maleic anhydride | 8 |
| Dimethyl terephthalate | 2 |

The resulting product had an acid number of 38 and a viscosity (Gardner-Holdt) of $Y+$.

EXAMPLE 8

An unsaturated polyester of this invention was prepared using the following proportions:

| | Mol proportions |
|---|---|
| Neopentyl glycol | 4 |
| Ethylene glycol | 7.5 |
| Dimethyl terephthalate | 4.0 |

One hundred parts of the above was mixed with 0.06 part of lead oxide and the mixture was gradually heated to a temperature of 180° C. and maintained at this temperature for 5 hours at which point the ester interchange reaction was completed. Next, 6 moles of fumaric acid were added. The temperature was raised to 210° C. and maintained at this level for 6½ hours. The Gardner-Holdt viscosity was S+ and the resultant product was amorphous.

Five hundred and fifty parts of the above unsaturated polyester was hot-blended with 450 parts of styrene at a temperature of about 135° C. using 0.5 part of methyl hydroquinone as the inhibitor. The Gardner-Holdt viscosity was F.

The noncrystalline polyester was soluble in the styrene and produced an organic solvent-resistant product.

EXAMPLES 9 to 15

The following polyester compositions in Table I were prepared by hot-blending the unsaturated polyester of Examples 1 to 7 with styrene or diallyl phthalate at temperatures of about 135° C. using hydroquinone as the inhibitor in an amount of 0.02 percent of the total weight of the polyester component.

TABLE I

| Example | Polyester of Example— | Monomer | Weight percent of monomer of total composition | Viscosity (Gardner-Holdt) |
|---|---|---|---|---|
| 9 | 1 | Diallyl phthalate | 50 | $Z_7+$ |
| 10 | 2 | ...do... | 50 | $Z_2+$ |
| 11 | 3 | Styrene | 35 | $Z_4+$ |
| 12 | 4 | ...do... | 35 | $Z_3+$ |
| 13 | 5 | ...do... | 35 | $Z_3+$ |
| 14 | 6 | Diallyl phthalate | 50 | $Z_6+$ |
| 15 | 7 | ...do... | 50 | $Z_4+$ |

The advantageous properties of the above polyester compositions were demonstrated by tests of castings, produced by adding 1 percent by weight of the composition of benzoyl peroxide catalyst and curing at a schedule consisting of gelation at 140° F. plus 1 hour at 170° F. and 1 hour at 250° F.

Organic solvent-resistance of the specimens was evaluated on a weight change and appearance basis. The castings representing the above examples were refluxed for 1 day in each of the following mediums: acetone, ethyl acetate, toluene and trichloroethylene, each being held at its boiling point temperature throughout the test period. Each specimen was then wiped dry and weighed. A minimal weight change with little or no discoloration is considered excellent organic solvent-resistance. The result was as follows:

TABLE II

| Composition of Example— | Appearance and percent weight change in— | | | |
|---|---|---|---|---|
| | Acetone [1] | Ethyl acetate [1] | Toluene [1] | Trichloroethylene [1] |
| 9 | 0.05 | 0.02 | 0.03 | 0.04 |
| 10 | 0.73 | 0.34 | 0.08 | 0.52 |
| 11 | 6.78 | 7.13 | 8.77 | 13.69 |
| 12 | 5.26 | 5.26 | 5.97 | 12.68 |
| 13 | 2.35 | 1.53 | 0.78 | 3.00 |
| 14 | 0.53 | 0.08 | 0.09 | 0.23 |
| 15 | 0.21 | 0.11 | 0.37 | 0.11 |

[1] Unchanged.

These specimens were also observed after being refluxed for 28 days in the above solvents and found to have suffered only minor weight loss and no discoloration. Each of the castings exhibited outstanding organic solvent-resistance as indicated not only by the very low weight changes but also by the complete absence of any discoloration. The high degree of such resistance is especially evident in comparison with conventional resin systems such as those employing, for example, ethylene glycol in combination with phthalic acid and other similar components. These latter systems not only exhibit extensive discoloration but usually also suffer complete disintegration over a short period of time.

Excellent polyester systems similar to those described in the examples can also be obtained using, for example, vinyl toluene, or divinyl benzene and mixtures of these with styrene and diallyl phthalate, as well as by employing different acids and acid combinations such as fumaric acid or maleic acid and mixtures thereof, or by adding other dihydric alcohols, such as diethylene glycol, triethylene glycol, propylene glycol and mixtures thereof in small amounts to the glycol component of the polyester.

In view of the excellent organic solvent-resistance described above, and especially because of the outstanding resistance to discoloration caused by such chemicals, polyester compositions of this invention are extremely useful as linings for containers of organic solvents, as well as the primary materials for making the containers themselves. For example, they are exceptionally well-suited as linings for containers of acetone or toluene. Similarly, such materials may be used in a wide variety of applications in which organic solvent-resistance is needed, such as in linings for ducts, tanks, pipes and the like, which carry fumes or solutions containing such chemicals and are generally useful as coatings for any kind of surface, such as, for example, metal surfaces such as steel surfaces, fiberglass reinforced resin surfaces, wood surfaces, etc.

Although specific examples of the instant invention have been set forth hereinabove, it is not intended that the invention be limited solely thereto, but to include all the variations falling within the scope of the appended claims.

I claim:

1. An organic solvent-resistant, non-crystalline, unsaturated polyester which is soluble in a polymerization ethylenically unsaturated monomer comprising a glycol component consisting essentially of:
  (a) from about 50 mol percent to about 90 mol percent of ethylene glycol, and
  (b) from about 10 mol percent to about 50 mol percent of neopentyl glycol-type diol represented by the structure:

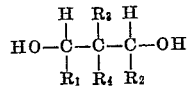

where $R_1$ and $R_2$ are selected from the group consisting of hydrogen and lower alkyl radicals and where $R_3$ and $R_4$ are each lower alkyl radicals
and an acid component consisting of:
  (a) from about 50 mol percent to about 90 mol percent of a polymerizable ethylenically unsaturated dicarboxylic acid, and
  (b) from about 10 mol percent to about 50 mol percent of a member selected from the group consisting of terephthalic acid or a lower alkyl diester thereof and isophthalic acid or a lower alkyl diester thereof.

2. The unsaturated polyester of claim 1 wherein the molar ratio of glycol components to acid components is from about 1:1 to about 1.3:1.

3. The unsaturated polyester of claim 1 wherein the polymerizable ethylenically unsaturated dicarboxylic acid is a member selected from the group consisting of maleic acid, maleic anhydride, fumaric acid, itaconic acid, itaconic anhydride and citraconic acid.

4. The unsaturated polyester of claim 1 wherein the lower alkyl diester of terephthalic acid is dimethyl terephthalate.

5. The unsaturated polyester of claim 1 wherein the polyester comprises from about 30 mol percent to about 50 mol percent of ethylene glycol and from about 2 mol percent to about 25 mol percent of neopentyl glycol and from about 30 mol percent to about 43 mol percent of maleic acid or maleic anhydride and from about 5 mol percent to about 20 mol percent of terephthalic acid based on the total number of mols of glycol and dibasic acid.

6. The unsaturated polyester of claim 1 consisting of 5 mol percent neopentyl glycol, 48 mol percent ethylene glycol, 42 mol percent maleic anhydride and 5 mol percent terephthalic acid.

7. A resinous composition comprising a polymerizable ethylenically unsaturated compound and the polyester of claim 1.

8. The resinous composition of claim 7 wherein the molar ratio of glycol components to acid components in the unsaturated polyester is from about 1:1 to about 1.3:1.

9. The resinous composition of claim 7 wherein the polyester comprises neopentyl glycol, ethylene glycol, maleic anhydride and terephthalic acid.

10. The resinous composition of claim 9 wherein the polyester comprises from about 30 to about 50 mol percent of ethylene glycol, from about 2 to about 25 mol percent of neopentyl glycol, from about 30 to about 43 mol percent of maleic anhydride, and from about 5 to about 20 mol percent of terephthalic acid based on the total number of mols of glycol and dibasic acid.

11. The resinous composition of claim 7 wherein the unsaturated polyester consists of 5 mol percent of neopentyl glycol, 48 mol percent of ethylene glycol, 42 mol percent of maleic anhydride and 5 mol percent of terephthalic acid.

12. The composition of claim 7 wherein the polymerizable compound is diallyl phthalate.

13. The composition of claim 7 wherein the polymerizable monomer is styrene.

14. An article comprising a substrate having thereon an organic solvent-resistant adherent coating consisting essentially of a cured layer of the polyester composition of claim 7.

15. The article of claim 14 wherein the substrate is metal.

16. A container having as a lining thereon the polyester composition of claim 7.

References Cited

UNITED STATES PATENTS 3,345,339  10/1965  Parker et al. _____ 260—861

FOREIGN PATENTS 1,017,789  9/1957  Germany.
1,029,147  4/1958  Germany.
815,084  6/1959  Great Britain.
993,378  5/1965  Great Britain.

GEORGE F. LESMES, *Primary Examiner.*

J. T. GOOLKASIAN, *Assistant Examiner.*

U.S. Cl. X.R.

260—861, 75; 117—132, 148, 138.8

U.S. DEPARTMENT OF COMMERCE
PATENT OFFICE
Washington, D.C. 20231

UNITED STATES PATENT OFFICE
CERTIFICATE OF CORRECTION

Patent No. 3,435,094                            March 25, 1969

Earl E. Parker

It is certified that error appears in the above identified patent and that said Letters Patent are hereby corrected as shown below:

Column 8, line 31, "polymerization" should read -- polymerizable --.

Signed and sealed this 7th day of April 1970.

(SEAL)
Attest:

Edward M. Fletcher, Jr.                      WILLIAM E. SCHUYLER, JR
Attesting Officer                              Commissioner of Patents